United States Patent [19]

Heaney et al.

[11] 4,236,352

[45] Dec. 2, 1980

[54] PLANT WATERING DEVICE

[76] Inventors: William B. Heaney, c/o George Spector 3615 Woolworth Bldg., 233 Broadway; George Spector, 3615 Woolworth Bldg., 233 Broadway, both of New York, N.Y. 10007

[21] Appl. No.: 952,476

[22] Filed: Oct. 18, 1978

[51] Int. Cl.³ .............................................. A01G 27/00
[52] U.S. Cl. .......................................... 47/80; 119/5
[58] Field of Search ............................... 47/79–82; 239/49–50; 222/187; 431/315

[56] References Cited

U.S. PATENT DOCUMENTS

| 842,501 | 1/1907 | Schoenecke | 47/80 |
| 2,072,185 | 3/1937 | Schein | 47/81 |
| 2,344,202 | 3/1944 | Carlson | 47/80 |
| 2,865,137 | 12/1958 | Longacre | 47/80 |
| 2,885,825 | 5/1959 | Longacre | 47/79 |
| 3,261,125 | 7/1966 | Arkebauer | 47/81 |
| 3,958,366 | 5/1976 | Meyers | 47/81 |

FOREIGN PATENT DOCUMENTS

| 1168485 | 12/1958 | France | 47/80 |
| 274148 | 1/1953 | Switzerland | 47/80 |
| 342030 | 12/1959 | Switzerland | 47/81 |

Primary Examiner—Robert E. Bagwill

[57] ABSTRACT

A self-watering, appliance for a potted plant, the device including an earth-filled, plant pot placed above a vessel of water, a downwardly tubular neck on the bottom of the pot extending into the water, a quantity of spagnum moss stuffed into the tubular neck providing capillary action for water to be drawn up to plant roots in the earth, and valve means on the extension for controlling amount of water drawn up into the pot.

2 Claims, 5 Drawing Figures

U.S. Patent
Dec. 2, 1980
4,236,352
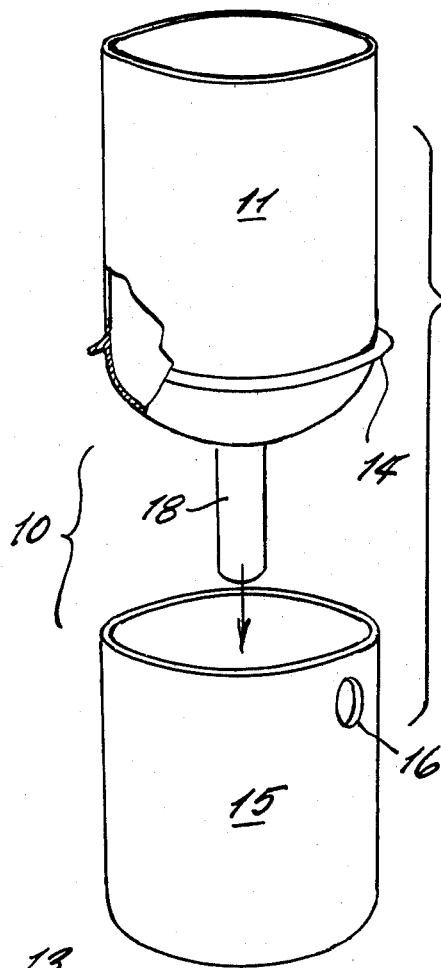
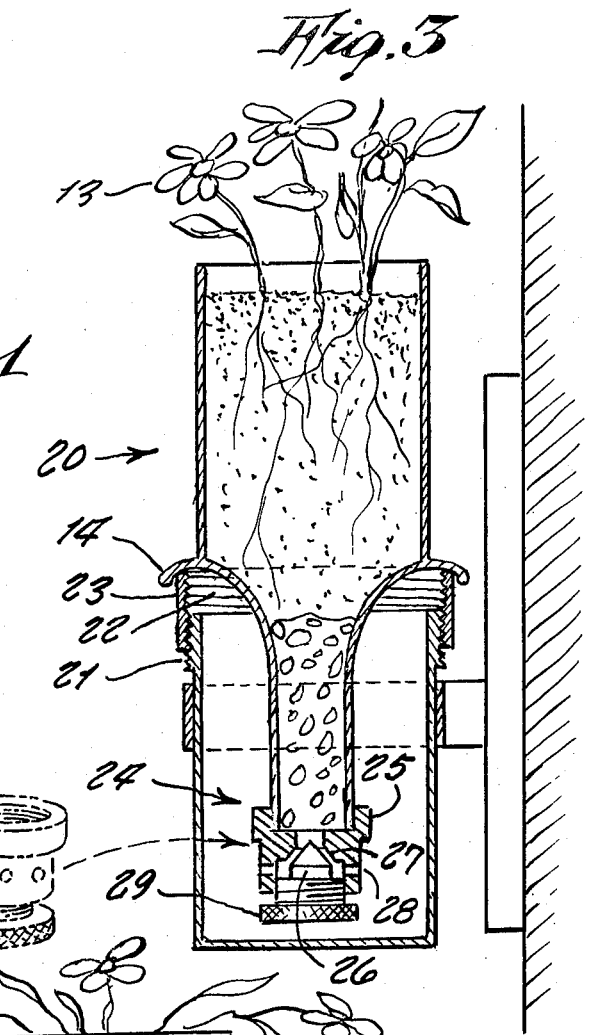
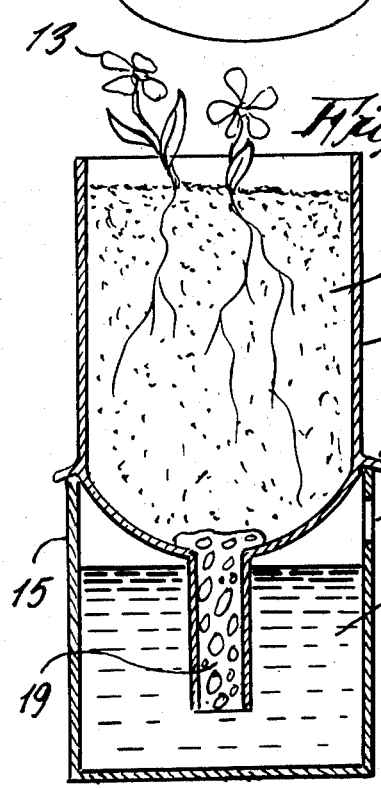
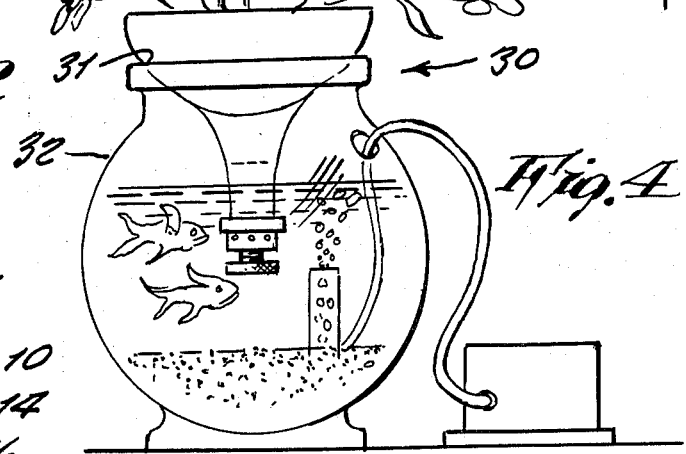
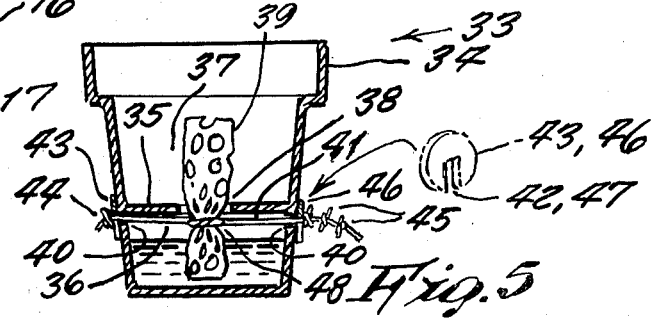

PLANT WATERING DEVICE

This invention relates generally to house plant accessories.

It is well known that at times when a person is away from home for many days such as when on a vacation, the house plants can wilt due to lack of regular watering. This is objectionable so that there is a want of improvement in this situation.

Accordingly, it is a principal object of the present invention to provide a plant-o-matic self watering device which will continue to water a potted plant automatically over a long period of time without attention by a person.

Another object is to provide a plant-o-matic self watering device which gives a controlled regulated amount of water to a plant, so that it is ideal for use even when a person is at home and available for otherwise watering plants, thereby eliminating this chore.

Still another object is to provide a plant-o-matic self watering device which is adjustable so to regulate larger or smaller water quantities to plants as individually needed.

FIG. 1 is a perspective view of the invention components shown separated.

FIG. 2 is a cross sectional view thereof shown assembled and in use.

FIG. 3 is a side cross sectional view of a wall model design thereof.

FIG. 4 is a side view of still another design for fitting on a fish bowl, for use of water therefrom.

FIG. 5 shows still another design of the invention incorporated in a flower pot, and including means to control a volume of water delivered to a plant.

Referring now to the drawing in greater detail, and more particularly to FIGS. 1 and 2 thereof at this time, the reference numeral 10 represents a plant-o-matic self watering device wherein there is a pot 11 containing earth 12 in which a plant 13 is rooted. The pot includes a sidewardly extending bead or flange 14 formed therearound so to rest upon an upper edge of a vessel 15 therebelow and which contains water 17. A refill hole 16 is above the water level.

The pot is made integral with a downwardly extending tubular neck 18 on its underside and which extends down into the water. A quantity of spagnum moss 19 is stuffed into the neck, and the earth rests thereupon.

In operative use, capillary action causes the water to be drawn up through the moss and into the earth so to provide moisture to the plant roots. The only chore needed for watering a plant is to occassionally refill the vessel with water when it gets low.

In FIG. 3 a similar device 20 is provided except that the upper end of the vessel has a screw thread 21 engaging a thread 22 of a collar 23 upon which the pot is rested, so that the collar can be raised or lowered selectively as wished, in order to control the depth of the pot neck within the water.

Additionally, in FIG. 3, a valve 24 is fitted on the pot neck to control the ratio of water flow into the neck. The valve includes a valve housing 25 pressed on the end of the neck and in which a valve stem 26 is screwed a selected distance so to regulate a gap 27 through which water from intake openings 28 must pass. A knurlled knob 29 on the valve stem provides easy rotation of the stem. The device 20 is shown supported in a wall bracket mounted on a wall.

In FIG. 4 a similar device 30 is a same as device 20 except that the pot is shaped so to rest on top of a mouth rim 31 of a fish bowl 32.

In FIG. 5 still another design 33 is shown wherein a pot 34 is made with a horizontal partition 35 so to form a water chamber 36 therebelow and an earth holding compartment 37 thereabove. The partition has a small central opening 38 through which a quantity of spagnum moss or a sponge 39 extends so a lower end thereof is in a water while the upper end contacts the earth. A hole 40 on diametrically opposite side walls of the water chamber are made above a water level, and a string or cord 41 looped and loose-tied at its center once around the center of the sponge extends at its opposite ends through the two holes 40. One end of the cord is inserted through a slot 42 of a disk 43 positioned against an outer side of the pot, and a knot 44 on the string end firmly bears against the disk, while an opposite end of the cord has a plurality of spaces apart knots 45 so that a second disk 46 having a slot 47 can be fitted selectively before any one of the knots. Thus the loop 48 of the cord around the sponge can be made loose or more tightly as wished by pulling less or more on the cord so to control the water volume moving according to the sponge, construction amount, and then anchoring the cord end at a selected knot 45 behind the disk 46. To refill the chamber with water just place the pot in water so to enter through holes 40.

What is claimed is:

1. A plant watering device, comprising in combination, a quantity of earth in a container for plants to be rooted therein, a quantity of water below said container, a spongy material extending from said earth down to said water and manually adjustable constricting means to control water volume traveling through said material by a capillary action, wherein said container comprises an upper compartment of a pot having a horizontal partition so to form a chamber therebelow for said water, small opening through said partition and through which said material extends, wherein said means further comprises holes in diametrically opposite side walls of said chamber above a water level thereof, a cord looped once and loose tied at its center around said material while opposite ends of said cord extend outwardly of said holes and are secured.

2. The combination as set forth in claim 1, wherein a plurality of knots are provided at said cord ends and a disc having a slit is placed between said pot side wall and a selected knot.

* * * * *